United States Patent
Sayers et al.

(10) Patent No.: US 10,816,958 B2
(45) Date of Patent: Oct. 27, 2020

(54) BUILD TRAY MODEL ASSIGNMENT AND FABRICATED PART SORTING

(71) Applicant: HEWLETT-PACKARD DEVELOPMENT COMPANY, L.P., Houston, TX (US)

(72) Inventors: Craig Peter Sayers, Palo Alto, CA (US); Prakash D. Reddy, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 79 days.

(21) Appl. No.: 16/074,911

(22) PCT Filed: Oct. 25, 2016

(86) PCT No.: PCT/US2016/058606
§ 371 (c)(1),
(2) Date: Aug. 2, 2018

(87) PCT Pub. No.: WO2018/080440
PCT Pub. Date: May 3, 2018

(65) Prior Publication Data
US 2019/0041828 A1    Feb. 7, 2019

(51) Int. Cl.
*G05B 19/4099*    (2006.01)
*B33Y 50/00*    (2015.01)
(Continued)

(52) U.S. Cl.
CPC ........ *G05B 19/4099* (2013.01); *B29C 64/153* (2017.08); *B29C 64/386* (2017.08); *B33Y 50/00* (2014.12); *G05B 2219/49023* (2013.01)

(58) Field of Classification Search
CPC ..... B29C 64/153; B29C 64/386; B33Y 50/00; G05B 19/4099; G05B 2219/49023
See application file for complete search history.

(56) References Cited

U.S. PATENT DOCUMENTS

| 9,245,061 B2 | 1/2016 | Schouwenburg |
| 2008/0083662 A1 | 4/2008 | Stemmle |

(Continued)

FOREIGN PATENT DOCUMENTS

| WO | 2015143007 A2 | 9/2015 |
| WO | 2016088042 A1 | 6/2016 |

OTHER PUBLICATIONS

"3D Print in Nylon with Selective Laser Sintering—Part 3", The Shapeways Blog, 3D Printing News and Innovation, Retrieved from Internet: http://www.shapeways.com/blog/archives/17704-3d-print-in-nylon-with-selective-laser-sintering-part-3.html, Jul. 5, 2016, 6 pages.

(Continued)

*Primary Examiner* — Chad G Erdman
(74) *Attorney, Agent, or Firm* — HP Inc. Patent Department

(57) ABSTRACT

In one example, an executable program on a computer-readable storage medium that instructs a processor to predict a characteristic of at least some parts in plural orders from a corresponding computer model of the part. The program also instructs the processor to assign, based on the predicted characteristics, models of at least some similar parts from different orders to different build trays usable to fabricate the parts. The program further instructs the processor to, for each build tray, sort the fabricated parts into the plural orders by matching a measured characteristic of a part to a predicted characteristic of unsorted parts from the build tray.

18 Claims, 8 Drawing Sheets

(51) Int. Cl.
*B29C 64/386* (2017.01)
*B29C 64/153* (2017.01)

(56) References Cited

U.S. PATENT DOCUMENTS

| | | | |
|---|---|---|---|
| 2013/0310965 A1* | 11/2013 | Schouwenburg | G06F 17/50 700/119 |
| 2015/0057784 A1 | 2/2015 | Butler et al. | |
| 2016/0067927 A1 | 3/2016 | Voris et al. | |
| 2016/0214324 A1* | 7/2016 | Schouwenburg | G06F 17/50 |
| 2018/0104898 A1* | 4/2018 | Lameris | B29C 64/20 |

OTHER PUBLICATIONS

Willis et al., "InfraStructs: Fabricating Information Inside Physical Objects for Imaging in the Terahertz Region", Retrieved from Internet: http://www.karlddwillis.com/wp/wp-content/uploads/2011/03/SIGGRAPH2013-InfraStructs.pdf, ACM Transactions on Graphics, vol. 32, No. 4, Article 138, Jul. 2013, 10 pages.

* cited by examiner

300

```
┌─────────────────────────────────────────────────────────────┐
│  PREDICT A CHARACTERISTIC OF EACH PART IN PLURAL ORDERS     │
│  FROM A CORRESPONDING COMPUTER MODEL OF THE PART  310       │
└─────────────────────────────────────────────────────────────┘
                              │
┌─────────────────────────────────────────────────────────────┐
│   ASSIGN THE MODELS TO BUILD TRAYS SUCH THAT AT LEAST       │
│   SOME MODELS, FROM DIFFERENT ORDERS, HAVING SIMILAR        │
│   PREDICTED CHARACTERISTICS ARE ASSIGNED TO DIFFERENT       │
│   BUILD TRAYS AND A PARTICULAR ONE OF THE BUILD TRAYS       │
│        INCLUDES MODELS FROM PLURAL ORDERS  320              │
└─────────────────────────────────────────────────────────────┘
                              │
┌─────────────────────────────────────────────────────────────┐
│  FABRICATE THE PARTS CORRESPONDING TO THE MODELS IN THE     │
│           PARTICULAR BUILD TRAY  330                        │
└─────────────────────────────────────────────────────────────┘
                              │
┌─────────────────────────────────────────────────────────────┐
│  SORT THE FABRICATED PARTS INTO THE PLURAL ORDERS BY        │
│  MATCHING A MEASURED CHARACTERISTIC OF EACH FABRICATED      │
│  PART TO A PREDICTED CHARACTERISTIC OF UNSORTED PARTS       │
│         FROM THE PARTICULAR BUILD TRAY  340                 │
└─────────────────────────────────────────────────────────────┘
```

FIG. 3

```
┌─────────────────────────────────────────────────────────────┐
│ ORDER THE MODELS IN DECREASING SIZE OF THE PARTS WHICH      │
│ CORRESPOND TO THE MODELS 410                                │
└─────────────────────────────────────────────────────────────┘
```

- SEQUENTIALLY ASSIGN EACH MODEL TO A BUILD TRAY 420
  - DETERMINE A SET OF BUILD TRAYS HAVING SUFFICIENT SPACE AVAILABLE TO FABRICATE THE PART THAT CORRESPONDS TO THE MODEL 430
  - IF THE SET IS A SINGLE BUILD TRAY, ASSIGN THE MODEL TO THE SINGLE BUILD TRAY 440
  - COMPUTE A SORTING ERROR COST FOR ASSIGNING THE MODEL TO EACH BUILD TRAY IN THE SET 450
    - ESTIMATE A PROBABILITY OF CONFUSING A PART CORRESPONDING TO THE MODEL WITH EACH OTHER PART, FROM A DIFFERENT ORDER, THAT HAS A COMPUTER MODEL ALREADY ASSIGNED TO THE TRAY 455
      - COMPARE THE PREDICTED CHARACTERISTIC OF THE PART WITH THE PREDICTED CHARACTERISTIC OF EACH OTHER PART 458
    - CALCULATE, USING THE PROBABILITY, A PART ERROR COST RESULTING FROM CONFUSING THE PART WITH EACH OF THE OTHER PARTS 460
      - DETERMINE AN ORDER ERROR COST IF THE FABRICATED PART IS SORTED INCORRECTLY, & COMPUTE THE PART ERROR COST BY MULTIPLYING THE PROBABILITY BY THE ORDER ERROR COST 462
    - SELECT THE HIGHEST PART ERROR COST AS THE SORTING ERROR COST 470
  - ASSIGN THE MODEL TO THE BUILD TRAY THAT HAS THE LOWEST SORTING ERROR COST 480

SORT THE PARTS INTO ORDERS 340

IF ALL REMAINING UNSORTED PARTS ARE ASSOCIATED WITH A SINGLE ORDER, SORT ALL REMAINING UNSORTED PARTS INTO THE SINGLE ORDER WITHOUT MATCHING 510

ADJUST THE MEASURED CHARACTERISTIC AND/OR THE PREDICTED CHARACTERISTIC TO ACCOUNT FOR ADDITIONAL MATERIAL OF THE FABRICATED PART WHEN THE CHARACTERISTIC IS MEASURED 520

DISPLAY AN IMAGE OF AT LEAST ONE MODEL HAVING A SAME PREDICTED CHARACTERISTIC AS THE MEASURED CHARACTERISTIC OF A PARTICULAR FABRICATED PART, AND/OR AN INDICATION OF AN ORDER ASSOCIATED WITH EACH AT LEAST ONE MODEL 530

RECEIVE AN OPERATOR SELECTION OF THE ORDER INTO WHICH THE FABRICATED PART IS SORTED 535

COUNT THE PARTS SORTED INTO A PARTICULAR ORDER, & COMPARE THE PARTS COUNT TO A COUNT OF MODELS ASSOCIATED WITH THAT ORDER THAT ARE ASSIGNED TO THE BUILD TRAYS TO DETERMINE WHETHER THE PARTICULAR ORDER CONTAINS THE CORRECT NUMBER OF SORTED PARTS 540

COUNT THE NUMBER OF PARTS REMOVED FROM A PARTICULAR BUILD TRAY, & COMPARE THE NUMBER OF THE REMOVED PARTS TO A NUMBER OF MODELS ASSIGNED TO THE PARTICULAR BUILD TRAY TO VERIFY THAT ALL THE PARTS HAVE BEEN REMOVED FROM THAT BUILD TRAY 550

FIG. 5

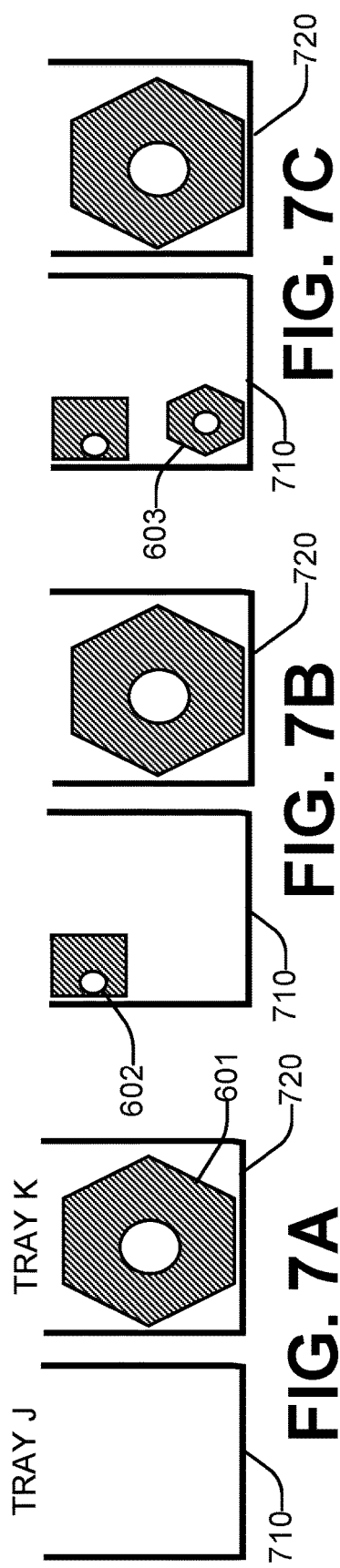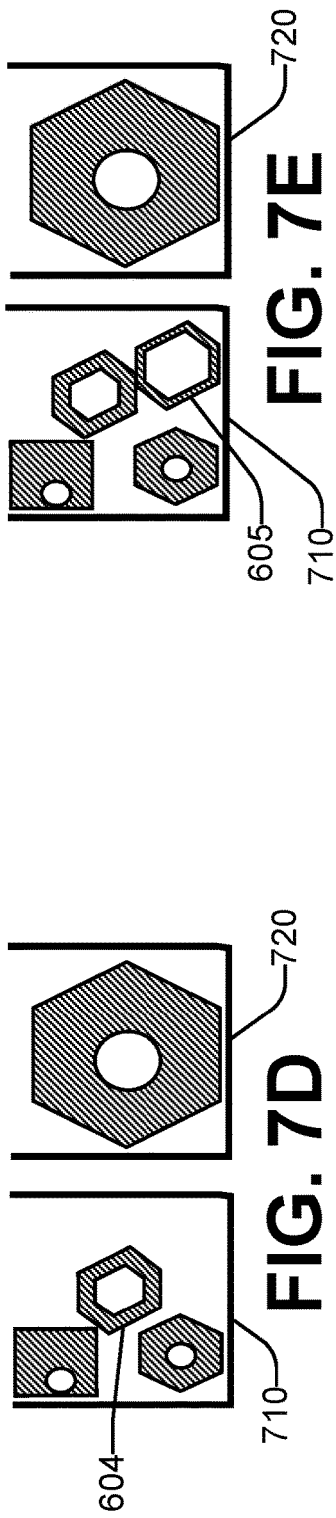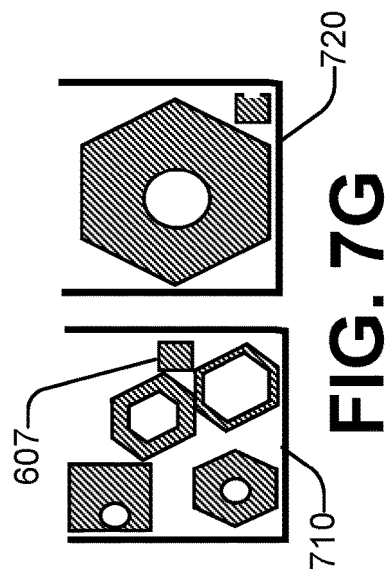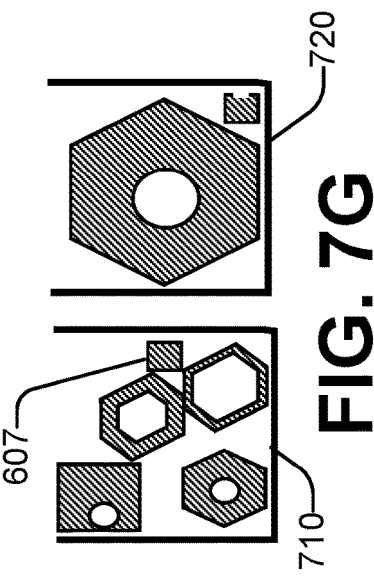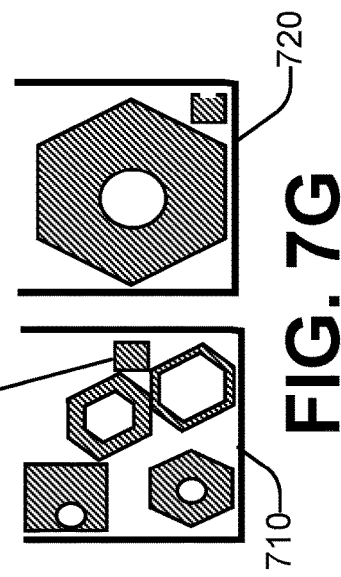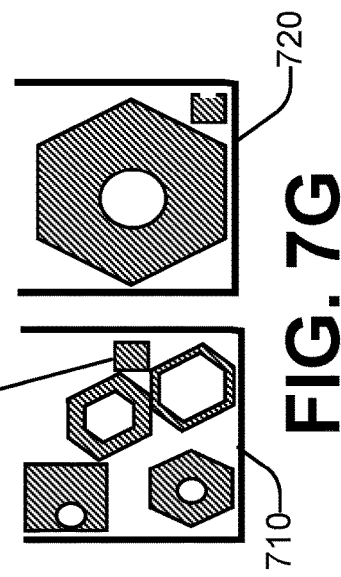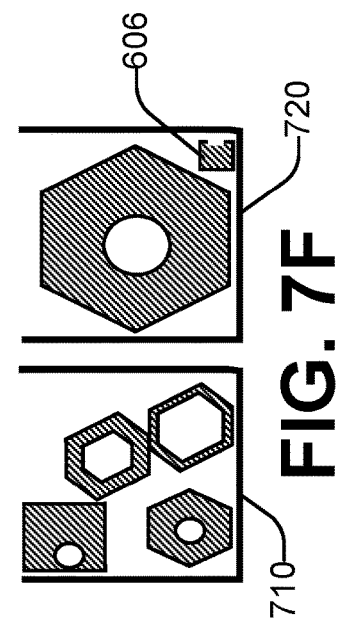

BUILD TRAY MODEL ASSIGNMENT AND FABRICATED PART SORTING

BACKGROUND

Parts can be fabricated by additive manufacturing techniques. Orders are received which specify the parts that are to be fabricated. Parts from different orders may be fabricated together, for cost or other reasons. After fabrication, the fabricated parts are then sorted into their respective orders for delivery to the requestor.

BRIEF DESCRIPTION OF THE DRAWINGS

FIG. 3 is a flowchart in accordance with an example of the present disclosure of a method of fulfilling additive manufacturing orders usable with the system of FIG. 1 or FIG. 2.

FIG. 4 is a lower-level flowchart in accordance with an example of the present disclosure of a method of the assigning operation of FIG. 3.

FIG. 5 is a lower-level flowchart in accordance with an example of the present disclosure of a method of the sorting operation of FIG. 3.

FIGS. 7A-7G are schematic sequential representations of assigning the example parts of the two example orders of FIG. 6 to two example build trays for additive manufacturing, in accordance with an example of the present disclosure.

DETAILED DESCRIPTION

Figure 1:
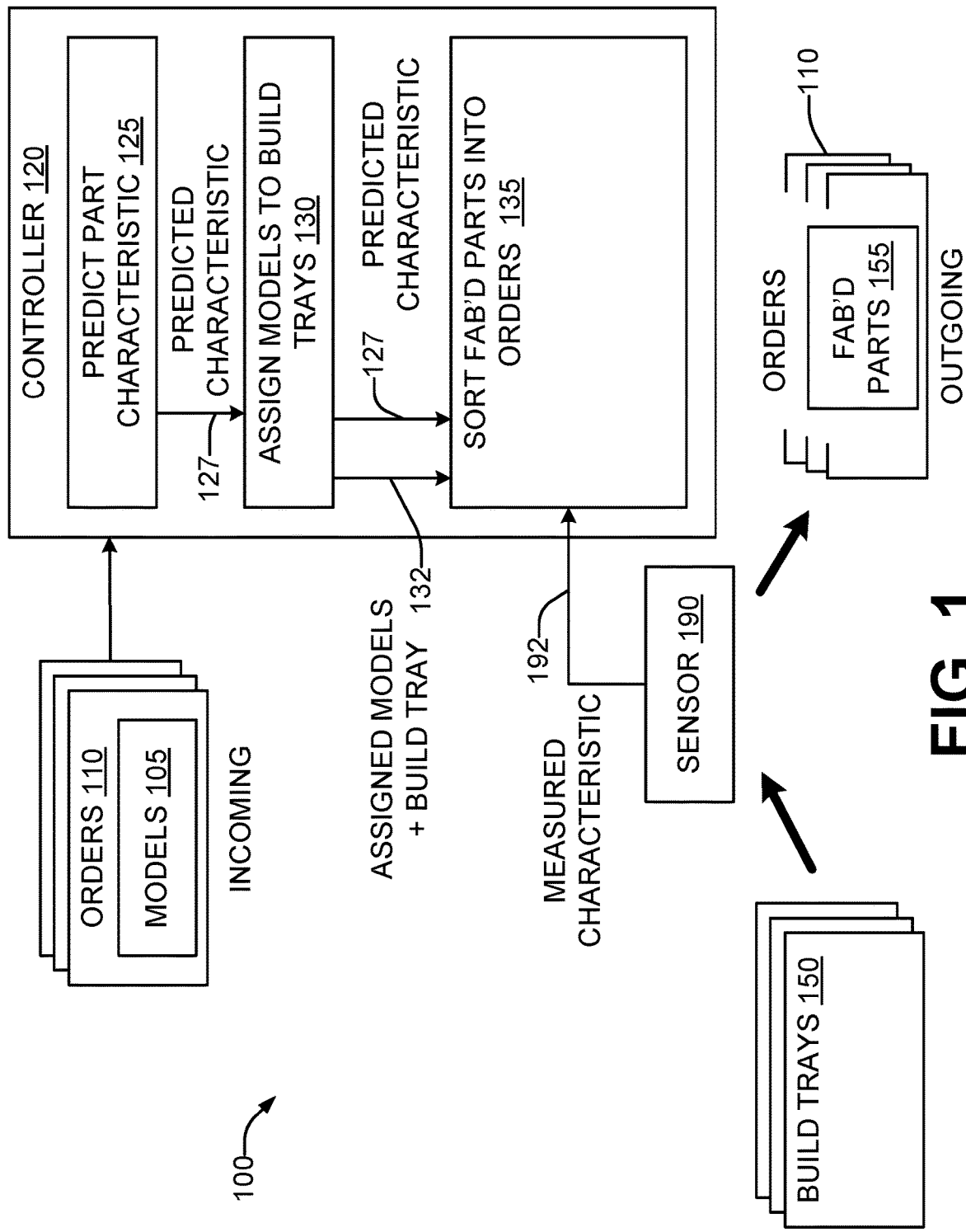
FIG. 1 is a schematic block diagram representation of an order fulfillment system for additive manufacturing, in accordance with an example of the present disclosure.

In additive manufacturing, a 3D computer model (a 3D digital representation of design parameters) of a part to be fabricated may be divided ("sliced") into a series of thin, adjacent parallel planar slices. The 3D part may then be fabricated layer-by-layer. Each slice of the representation generally corresponds to a layer of the physical object to be fabricated. During fabrication, the next layer is formed on top of the adjacent previous layer. In one example, each layer is about 0.1 millimeter in thickness.

Powder-based additive manufacturing systems may use a build material as the material from which each layer is fabricated. The build material may be contained within the system in a build tray, which may be a removable element of the system. In one example, the build material is a fine powder (particulate material), such as for example polyamide (nylon). Other build materials may be powders of a different composition and/or having a different cohesive strength. At least one build tray may be processed by the additive manufacturing system at a time. During fabrication of each layer of a part, in one example the regions of the build material which correspond to the location of the part within the corresponding slice, are selectively fused or bound together, while the other regions remain in unfused or unbound form. Once the part is completely fabricated, any unfused or unbound build material may be removed.

In one example, the additive manufacturing system has a build mechanism which uses a laser to selectively fuse the build material layer-by-layer. To do so, the laser is accurately positioned to irradiate the regions of the build material to be fused in each layer. Such a laser-based system with accurate position control for the fusing laser may be costly. Another example additive manufacturing system has a build mechanism that uses a simpler and less expensive heat source to fuse the build material in each layer, rather than a laser. The build material may be of a light color, which may be white. In one example, the build material is a light-colored powder. A print engine controllably ejects drops of a liquid fusing agent onto the regions of powder which correspond generally to the location of the cross-section of the part within the corresponding digital slice. The print engine, in an example, uses inkjet printing technology. In various examples, the fusing agent is a dark colored liquid such as for example black pigmented ink, a UV absorbent liquid or ink, and/or other liquid(s). A heat source, such as for example one or more infrared fusing lamps, is then passed over the entire print zone. The regions of the powder on which the fusing agent have been deposited absorb sufficient radiated energy from the heat source to melt the powder in those regions, fusing that powder together and to the previous layer underneath. However, the regions of the powder on which the fusing agent have not been deposited do not absorb sufficient radiated energy to melt the powder. As a result, the portions of the layer on which no fusing agent was deposited remain in unfused powdered form. To fabricate the next layer of the part, another layer of powder is deposited on top of the layer which has just been processed, and the printing and fusing processes are repeated for the next digital slice. This process continues until the part has been completely fabricated.

Additive manufacturing systems may be utilized to fabricate prototype or production 3D parts in business environments which accept part fabrication orders from a variety of different customers or sources. To maximize efficiency or utilization of the additive manufacturing system, and/or to minimize part fabrication costs, various parts from various orders may be grouped together in an individual build which is then processed as a unit by the additive manufacturing system to fabricate all the parts in the build at substantially the same time. The unfused build material is removed in a post-processing step after the parts have been fabricated. In addition to removing unfused build material, a post-processing step may also remove additional structures, if any, which assisted fabrication of the part but which are not included in the completed part.

Another of the post-processing steps is sorting the fabricated parts in the build so that they can be associated with their respective orders, in preparation for delivery of those orders to the proper customer or source. One of the problems with powder-based 3D printing systems is that the parts are buried within a volume of unfused powdered. The parts are hidden until the unfused or unbound powder is removed. Unpacking is mainly a manual process because automated processes generally leave an unorganized pile of printed items, making it hard to identify parts from different orders.

Mistakes in sorting the fabricated parts are frustrating and expensive. Customers are dissatisfied when they receive an incomplete or incorrect order. They expend extra effort to contact the manufacturer and arrange for replacement parts. Even once the sorting mistake is identified and corrective action taken by the manufacturer, the customer incurs delays in receiving a complete order. The manufacturer also incurs extra costs as a result of needing to fabricate extra parts to replace those which were omitted as a result of mis-sorting, and this can ripple through to delay orders of other customers. In addition, there may be contractual costs to the manufacturer for shipping improper or incomplete orders to customers, or not fulfilling them by a specified time. Furthermore, different parts may incur different mis-sorting costs. Thus it is highly desired by all parties that the fabricated parts be correctly sorted after fabrication.

One factor that can cause errors in sorting is the similarity between parts, from different orders, that are fabricated in the same build tray. Often the sorting error results from two (or more) similar parts improperly getting swapped, causing errors in not just one order, but at least two orders. The degree of similarity in one or more characteristics of different parts—for example, their mass (or weight), volume, dimensionality, shape, color, density, and/or additional characteristics—can be directly proportional to the likelihood or probability that the parts get incorrectly sorted if they are fabricated in the same build tray. Some or all of these characteristics can be predicted (or determined) from the corresponding computer design model of the part.

In an example according to the present disclosure, the computer models of parts to be fabricated are assigned to build trays such that at least some models, from different orders, having similar predicted characteristics are assigned to different build trays, and at least one of the build trays includes models from plural orders. In addition, the fabricated parts in the build tray are sorted into the different orders by matching a measured characteristic of a fabricated part in a build tray with the predicted characteristic (determined from the computer model) of the as-yet unsorted parts that remain in that build tray. Because models from different orders but having similar predicted characteristics are assigned to different build trays, the number of similar models from different orders in the same build tray is reduced or minimized. This, in turn, reduces, minimizes, and/or eliminates the potential for sorting errors. Where a predicted characteristic of a single part in a particular build tray matches the measured characteristic of the fabricated part, the correct order for that part can be identified with certainty and/or automatically. Where a predicted characteristic of multiple parts from different orders in a particular build tray matches the measured characteristic of the fabricated part, the number of such similar parts has been reduced or minimized by the model assignment operation performed previously. This reduces or minimizes the number of parts with which the fabricated part is to be compared further, for example by manual or automated comparison of additional characteristics. It also reduces or minimizes the number of possible orders into which the fabricated part can be sorted. Reducing the number of potential part matches can both speed up the sorting process, and reduce the number and/or cost of sorting errors.

Thus one core concept of the present disclosure includes predicting, for each part in plural orders, a characteristic of the part from the corresponding 3D computer design model for that part. This computer model is a 3D digital representation of design parameters of the part, generally supplied by the customer or source which places the order. In some examples, this model is not readable and interpretable by a human operator. The predicted characteristic is then used in assigning the parts to build trays as described above. After fabrication, the characteristic of the fabricated part is automatically measured with a sensor, for comparison of the measured characteristic to predicted characteristics during the sorting process. This concept is a significant advance in the order fulfillment process for additive manufacturing systems by improving the speed and accuracy of sorting fabricated parts into their corresponding orders.

Considering now an example order fulfillment system for additive manufacturing, and with further reference to FIG. 1, a system 100 includes a sensor 190 communicatively coupled to a controller 120.

The controller 120 receives plural orders 110, each order 110 for at least one part to be fabricated by additive manufacturing. Each order 110 is associated with a 3D computer design model 105 for each of the parts in the order, and the controller 120 also receives the models 105 for each order 110.

The controller 120 includes a part characteristic prediction module 125 which predicts a predicted characteristic 127 of a part in an order 110 that is to be fabricated. The predicted characteristic 127 is determined from the model 105 that is used in the additive manufacturing process to fabricate the corresponding part. The predicted characteristic 127 may be at least one of mass (or weight), volume, dimensionality, shape, color, density, and/or other characteristics that are usable to sort fabricated parts into orders.

The controller 120 includes a build tray assignment module 130 that assigns each model 105 to one of a set of build trays 150. At least one build tray 150 includes models 105 from plural orders 110. The build tray assignment module 130 assigns at least some models 105, having similar predicted characteristics 127 but from different orders 110, to different build trays 150.

After the assignment of models 105 to a build tray 150 is complete, the physical parts corresponding to the models 105 are fabricated in that build tray 150 by an additive manufacturing system (not shown). The additive manufacturing system receives from the controller 120 assignment data 132 that identifies the build tray 150 and that specifies the assigned models 105 assigned to that build tray 150. The additive manufacturing system also receives from the controller 120 the assigned models 105 themselves for use in fabricating the corresponding parts.

After the parts have been fabricated in the build tray 150, they are sorted into their corresponding orders 110. The sensor 190 measures, directly or indirectly, a measured characteristic 192 of each fabricated part 155, and provides the measured characteristic 192 to a sorting module 135 of the controller 120. In some examples, the sensor 190 may also measure a build tray characteristic, such as for example a build tray identifier, a build tray weight, and/or other build tray characteristics.

The sorting module 135 of the controller 120 also receives an indication of the build tray 150 which is being sorted, the assignment data 132, and the predicted characteristic 127 of each part. The sorting module 135 sorts each fabricated part 155 from a build tray 150 into its corresponding orders 110 by comparing the measured characteristic 192 of the fabricated part 155 to the predicted characteristic 127 of as-yet unsorted fabricated parts from the same build tray, as is discussed subsequently in greater detail. At the start of the sorting operation, all of the parts 155 from the build tray 150 are unsorted. As each part 155 is identified and sorted, it is removed from the set of the as-yet unsorted fabricated parts from that build tray. The sorting process continues until all the as-yet unsorted fabricated parts have been sorted.

In some examples, the sorting (and the measurement of the measured characteristic 192) are performed after all the post-processing operations are performed. In some examples, the sorting takes place as the fabricated parts are being removed from the build tray 150. In some examples, the sorting (and the measurement of the measured characteristic 192) are performed before at least some other post-processing operations, such as removing excess material (e.g. powder and/or support structures) from the part, smoothing the part, and/or other post-processing operations have been performed. In this case, the predicted characteristic 192 can be adjusted to account for any excess material remaining on the fabricated part 155 at the time the measured characteristic is determined.

The sorting may include physically relocating the fabricated part 155 to a container and/or location that corresponds to the order 110.

Figure 2:
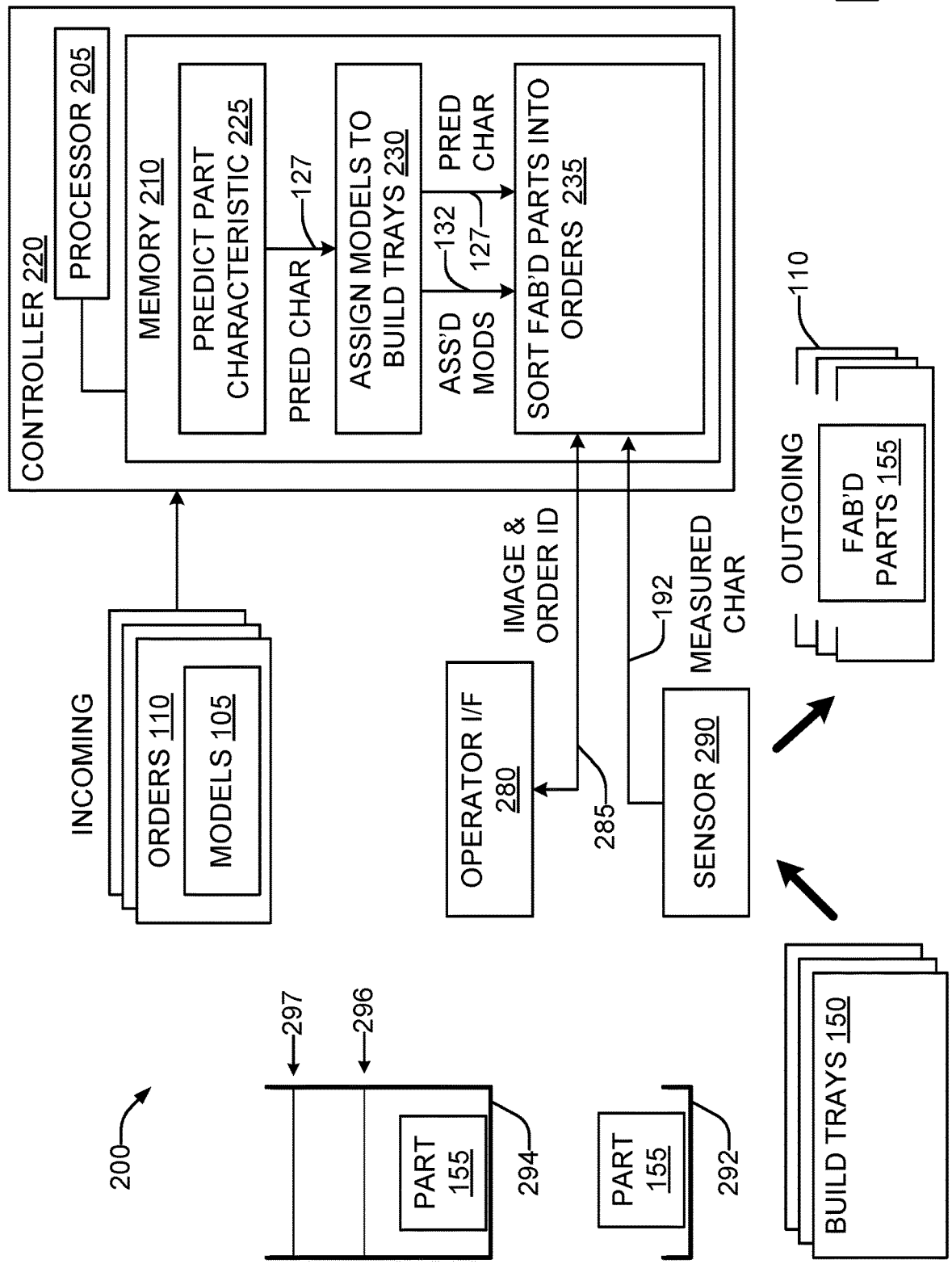
FIG. 2 is a schematic block diagram representation of another order fulfillment system for additive manufacturing, in accordance with an example of the present disclosure.

Considering now another example order fulfillment system for additive manufacturing, and with further reference to FIG. 2, a system 200 includes a sensor 290 communicatively coupled to a controller 220.

The controller 220 includes a processor 205 communicatively coupled to a non-transitory computer-readable storage medium 210. The storage medium 210 stores instructions and data for various modules of a program which is executable by the processor 205 to implement the functionality of the controller 220. The medium 210 includes a predicted part characterization module 225, a build tray assignment module 230, and a part sorting module 235 which in some examples are, or function in the same manner as, the predicted part characterization module 125, build tray assignment module 130, and part sorting module 135 (FIG. 1).

The sensor 290 measures, directly or indirectly, a measured characteristic 192 of each fabricated part 155, and provides the measured characteristic 192 to a sorting module 235 of the controller 220. In some examples, the sensor 290 additionally or alternatively measures a characteristic of the build tray 150, and/or a characteristic of an order 110 into which fabricated parts 155 have been sorted. In some examples, the sensor 290 is the sensor 190 (FIG. 1).

In one example, the predicted characteristic 127 is mass, the sensor 290 is a scale 292 to measure weight, and the measured characteristic 192 is weight. The sensor 290 may directly measure the weight of an individual part 155 from the build tray 150 by placing the part 155 on the scale 292. The placing may be done manually by an operator, or in an automated way by, for example, a robotic mechanism. The sensor 290 may indirectly measure the weight of the part 155 by measuring the weight of the build tray 150 before the part 155 is removed from the tray 150 and then again after the part 155 has been removed from the tray 150. The weight of the part 155 is determined as the difference in the two weights of the tray 150, and may be calculated by the sensor 290 or the controller 220. In one example, the sorting module 235 compares the measured weight 192 to the predicted mass 127 for the unsorted parts 155 in the build tray. Although a scale actually measures the force exerted by a weighed part rather than the mass of the part, under standard earth gravity a 1 kilogram mass exerts a 1 kg force, and so an object weighing 1 kg has a mass of 1 kg. This can be corrected for the altitude at which the object is measured, if desired. In this way, the mass of a weighed object can be determined from the measured weight of the object.

In another example, the predicted characteristic 127 and the measured characteristic 192 are volume, and the sensor 290 is a level sensor to measure a change in liquid level of an immersion bath 294 due to immersion of a fabricated part 155 in the bath 294. The change in liquid level of the bath 294 before 296 and after 297 immersion of the part 155 in the bath 294 corresponds to the volume of the fabricated part 155, and may be calculated by the sensor 290 or the controller 220 using the dimensions of the batch 294. In one example, the sorting module 235 compares the measured volume 192 to the predicted volume 127 for the unsorted parts 155 in the build tray.

In another example, the sensor 290 may additionally measure an order characteristic. In one example where the sensor is the scale 292, the scale 292 measures an order weight of all the sorted fabricated parts 155 for a particular customer order 110. The weight may be measured directly by placing all of the sorted fabricated parts 155 for the particular order 110 on the scale 292 together, or may be measured indirectly by summing the individual measured weights of each part 155 that is sorted into the particular order 110. The controller 220 calculates, from the models 105 of the parts of the particular order 110, a predicted order mass of the parts of the particular order 110. The predicted order mass can be converted to a predicted order weight, and the controller 220 determines whether the order 110 is complete by comparing the predicted order weight to the measured order weight. If the two weights match within an error limit, the order 110 is complete. If the measured order weight is heavier or lighter than the predicted order weight, then some of the parts 155 in the order 110 are incorrect. The order 110 may contain too many parts, too few parts, and/or incorrect parts.

The order fulfillment system 200 also includes an operator interface 280 communicatively coupled to the controller 220 via path 285. The operator interface 280 may include user output devices such as, for example, a display and/or a printer. The operator interface 280 may also include user input devices such as, for example, a mouse, a touchscreen, and/or a keyboard.

In some examples, the operator interface 280 is used during sorting of fabricated parts 155 to display an image of at least one part having a same predicted characteristic as the measured characteristic of a particular fabricated part. The image for each part having a similar predicted characteristic to the fabricated part 155 is generated by the controller 220 from the computer model 105 which corresponds to that part. In some examples, the operator interface 280 provides an indication of an order associated with each part having a similar predicted characteristic. This may be done by displaying an indication of the corresponding order along with the part image. For example, an order identifier may be displayed with each part image, an arrow may point to an order container associated with the part image, or another suitable means may be used.

In some examples, the operator uses an input device of the operator interface 280 to indicate to the controller 220 the displayed image which corresponds to the fabricated part. In some examples, the operator uses the input device to indicate to the controller 220 the order which corresponds to the fabricated part.

The operator interface 280 may also be used by the controller 220 to direct other activities of an operator who is manually sorting the parts. For example, the operator interface 280 may inform the operator to place a fabricated part on the scale 292 or in the bath 294, and then to remove the part after its characteristic is measured. Where a single part has a similar predicted characteristic to the measured characteristic, the controller 220 may use the operator interface 280 to direct the operator to sort the part into a corresponding order without displaying the image.

Considering now a method of fulfilling additive manufacturing orders, and with further reference to FIG. 3, a method 300 includes predicting, at 310, a characteristic of each part in plural orders from a corresponding computer model of the part. At 320, the computer models are assigned to build trays such that at least some models, from different orders, having similar predicted characteristics are assigned to different build trays and at least one of the build trays includes models from plural orders. The models may be assigned based on the predicted characteristics, and models for at least some similar parts from different orders are assigned to different build trays. The build trays are usable to fabricate the parts. At 330, the parts corresponding to the models in the build trays are fabricated. At 340, the fabricated parts are sorted into the plural orders by matching a measured characteristic of each fabricated part in a build tray to a predicted characteristic of unsorted parts from that build tray.

The assigning 320 to the different build trays prevents sorting errors for the parts having the similar predicted characteristics and which are assigned to the different build trays. The improper sorting of fabricated parts incurs sorting error costs, and the assigning 320 to the different build trays avoids sorting error costs for the parts having the similar predicted characteristics. In some examples, each build tray is sorted separately, and/or at different times. In some examples, the method 300 is performable using the order fulfillment system 100 (FIG. 1), 200 (FIG. 2). The measured characteristic of a part may be obtained, at least in part, by controlling a sensor 190 (FIG. 1), 290 (FIG. 2)

Considering now in greater detail one example of the assigning 320 of computer models to build trays, and with reference to FIG. 4, the assigning 320 includes, at 410, ordering (i.e. arranging) the models in a decreasing size order of the parts which correspond to the computer models. In one example, the part size corresponds to the part volume, and the part volume is calculated from the model. In other examples, the part size is determined by one or more dimensions of the part. At 420, each computer model is sequentially assigned to a build tray, beginning with the largest part and continuing the assignment of parts in decreasing size order until the smallest part is assigned.

In one example, the sequential assigning 420 determines, at 430, a set of the build trays which have sufficient space available to fabricate the part that corresponds to the model. Determining whether a build tray has sufficient space available accounts for other models which have already been assigned to that build tray. Determining whether a build tray has sufficient space available may be with reference to at least one predicted characteristic of the part corresponding to the model, such as for example its volume, dimensions, mass, and/or other characteristics. The model will be assigned to one of the build trays in this set.

If the set has a single build tray, then at 440 the model is assigned to the single build tray. If the set includes multiple build trays, then at 450 a sorting error cost for assigning the model to each build tray in the set is computed, based on other ones of the models which are already assigned to the corresponding build tray, and at 480 the model is assigned to the build tray in the set that has the lowest sorting error cost.

Considering one example of computing 450 the sorting error cost, and with continued reference to FIG. 4, at 455 a probability of confusing, during sorting, a part corresponding to the model with each other part, from a different order, that has a computer model which is already assigned to the build tray is estimated. In one example, at 458, the estimating 455 includes comparing the predicted characteristic of the part corresponding to the model with the predicted characteristic of each of the other parts which have already been assigned to the build tray. The more similar the predicted characteristics of the models for two parts are, the greater the probability of confusing the two parts during sorting.

At 460, an estimated expected part error cost ("part error cost") resulting from confusing the part with each of the other parts during sorting is calculated, using the estimated probability. A number of factors may be considered in determining the part error cost. These can include direct costs and/or indirect costs. Direct costs may include, for example, rework and/or contractual costs resulting from sorting of the part into an incorrect order. Indirect costs may include, for example, an increase in sorting time incurred in order to avoid incorrectly sorting similar parts in a build tray, or additional checking time incurred in order to avoid incorrectly sorting similar parts in a build tray. In one example, the calculating 460 includes, at 462, determining an order error cost if the fabricated part were to be sorted incorrectly, and computing the part error cost by multiplying the probability by the order error cost. The order error cost may be the same for all parts in an order, or may be different for different parts in the order. The order error cost may be determined from historical order error costs, contractual order error costs, or in another manner.

At 470, the highest part error cost is selected for use as the estimated sorting error cost ("sorting error cost").

In the preceding example of the assigning 320 of computer models to build trays, the number of build trays was predetermined before the parts were sorted into the build trays. In another example, the number of build trays may be adjusted by adding at least one additional build tray to the set during the assigning 320. Adding a build tray to the set incurs additional processing cost for that tray, such as for example the extra time to process the additional tray and/or other costs. Because no models have as yet been assigned to an additional build tray, the probability of confusing a part corresponding to the model with each other part from a different order is zero. Therefore, the part error cost for assigning the model to the additional build tray is determined as an additional processing cost of the additional build tray. In practice, whether or not the additional build tray will be selected for assignment of the model of a particular part depends, in many cases, upon the order error cost that would result from mis-sorting the particular part into the wrong order. If the order error cost is high, the order error cost may dominate the additional processing costs of adding an additional build tray, and result in the model for the particular part being assigned to an additional build tray even though there is sufficient room in an existing build tray to accommodate the part. Conversely, if the order error cost is low, the additional processing costs may dominate the order error cost, and result in the model for the particular part being assigned to an existing build tray. In some examples, assigning a model to a particular build tray may also incur a part fabrication cost, such as for example the extra time to print that build tray due to the corresponding part. The part fabrication cost may be dependent on the particular build tray to which the model is assigned, and may be added into the part error cost. In this way, tray-dependent part fabrication costs may be taken into account in determining the build tray to which the model is assigned.

Considering now in greater detail the sorting 340 of fabricated parts into plural orders, and with reference to FIG. 5, in one example the sorting 340 includes determining, at 510, whether all remaining unsorted parts are associated with a single order, and if so, sorting all the remaining unsorted parts into the single order without performing any comparison or matching of the measured and predicted characteristics for any of the parts, because the remaining unsorted parts belong to the single order.

In one example the sorting 340 includes, at 520, adjusting the measured characteristic and/or the predicted characteristic to account for additional material of the fabricated part when the characteristic is measured. The additional material may be powder remaining on the part before cleaning, additional structures not yet removed from the part, or other additional material.

In one example the sorting 340 includes, at 530, displaying an image of at least one computer model having a same predicted characteristic as the measured characteristic of a particular fabricated part, and/or an indication of an order associated with each model. The order indication may further be visually associated with the image. In one example, the displaying 530 includes, at 535, receiving an operator selection of the order into which the fabricated part is sorted.

In one example the sorting 340 includes, at 540, counting the number of parts removed from a particular build tray, and comparing the number of the removed parts to a number of models assigned to the particular build tray. This can verify that all of the parts have been removed from the particular build tray during the sorting.

In one example the sorting 340 includes, at 550, counting the parts sorted into a particular order, and comparing the parts count to a count of models associated with the particular order assigned to the build trays. This can determine whether the particular order contains the correct number of sorted parts.

Figure 6:
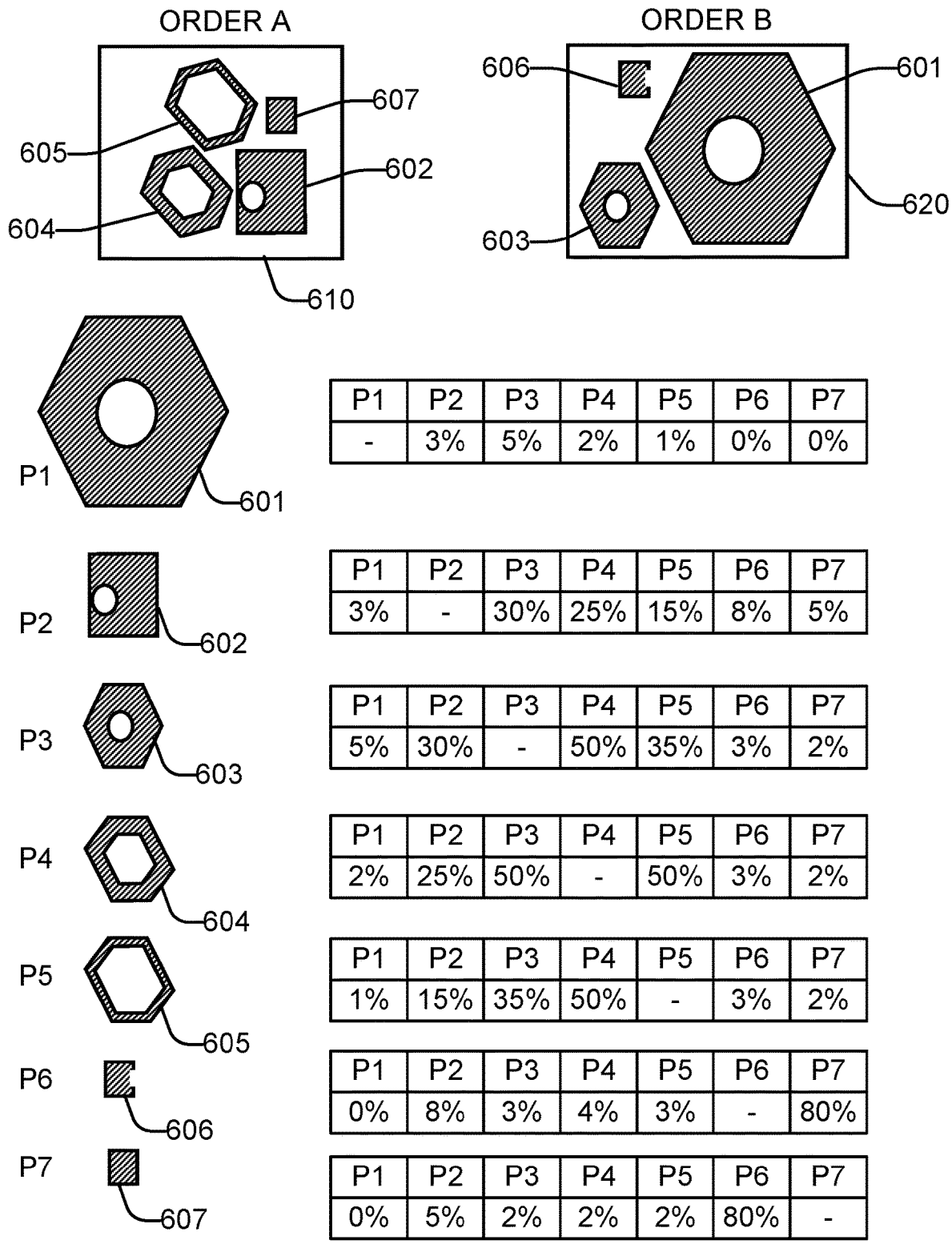
FIG. 6 is a schematic representation of two example orders for parts to be fabricated by additive manufacturing, and example parts in the orders, in accordance with an example of the present disclosure.

Consider now an example of performing a method of fulfilling an additive manufacturing order, and/or of the operation of an order fulfillment system for additive manufacturing, and with reference to FIGS. 6-8. Two example orders—order A 610 and order B 620—are specified. Order A 610 includes parts P2 602, P4 604, P5 605, and P7 607. Order B 620 includes parts P1 601, P3 603, and part P6 606.

The parts are labeled P1 to P7 in order of decreasing size. P1 601 has the largest size, and P7 607 has the smallest size. Next to each individual part P1-P7 in FIG. 6 is a table that presents an example estimated probability of confusing that part with the other parts of both orders, for use in illustrating the operation of the method and system. For example, part P3 603 has a 50% probability of being confused during sorting with part P4 604 and a 35% probability of being confused during sorting with part P5 605, but a 2% probability of being confused during sorting with part P7 607 and a 3% probability of being confused during sorting with part P6 606. For simplicity of illustration, assume that the order error cost for each part P1-P7 is $100, and thus a probability of 1% corresponds to a part error cost of $1.

Consider with reference to FIGS. 6 and 7A through 7G the assignment of these size-ordered example parts P1-P7 of orders A and B to build trays. Two example build trays are used: build tray J 710, and build tray K 720, which are illustrated in the same relative position in all of FIGS. 7A through 7G. The parts P1-P7 are assigned in the order of decreasing size, and as follows.

Part P1 601, from order B 620: because there are no computer models from either order A or order B assigned to build tray J 710 or build tray K 720, both build tray J 710 or build tray K 720 have sufficient space available for part P1 601. And because no part has yet been assigned to build tray J 710 or build tray K 720, there is no risk of confusing part P1 601 with any part previously assigned to either build tray J 710 or build tray K 720. As a result, part P1 601 could be assigned to either of build tray J 710 or build tray K 720, and in this example it is assigned to build tray K 720 as in FIG. 7A.

Part P2 602, from order A 610: build tray J 710 has sufficient space available for part P2 602, but not build tray K 720. As a result, part P2 602 is assigned to build tray J 710 as in FIG. 7B without computing a sorting error cost.

Part P3 603, from order B 620: build tray J 710 has sufficient space available for part P3 603, but not build tray K 720. As a result, part P3 603 is assigned to build tray J 710 as in FIG. 7C without computing a sorting error cost.

Part P4 604, from order A 610: build tray J 710 has sufficient space available for part P4 604, but not build tray K 720. As a result, part P4 604 is assigned to build tray J 710 as in FIG. 7D without computing a sorting error cost.

Part P5 605, from order A 610: build tray J 710 has sufficient space available for part P5 605, but not build tray K 720. As a result, part P5 605 is assigned to build tray J 710 as in FIG. 7E without computing a sorting error cost.

Part P6 606, from order B 620: both build tray J 710 and build tray K 720 have sufficient space available for part P6 606, so both of the build trays are in the set. With regard to computing the sorting error cost for assigning part P6 606 to build tray J 710: parts P2 602, P3 603, P4 604, and P5 605 have already been assigned to build tray J 710; part P3 603 is from the same order (order B 620) as part P6, so part P3 603 is not considered in computing the sorting error. Parts P2 602, P4 604, and P5 605 are from a different order (order A 610). For part P2 602 there is an error cost of $100, and an 8% error probability, so the expected value of the part error cost is $8; for part P4 604 there is an error cost of $100 and a 4% error probability so the expected value of the part error cost is $4; and for P5 605, there is an error cost of $100, and a 3% error probability, so the expected value of the part error cost is $3. The maximum of the expected values, in this case $8, is selected for use as the estimated sorting error cost if part P6 606 were placed in build tray J 710. With regard to computing the sorting error cost for assigning part P6 606 to build tray K 720: part P1 601 has already been assigned to build tray J 710; but because part P1 601 is from the same order (order B) as part P6 606, it is not considered in computing the sorting error. Thus build tray J 710 has a $8 sorting error cost, build tray K 720 has a $0 sorting error cost, and so part P6 606 is assigned to build tray K 720 which has the lowest sorting error cost, as in FIG. 7F.

Part P7 607, from order A 610: both build tray J 710 and build tray K 720 have sufficient space available for part P7 607, so both of the build trays are in the set. With regard to computing the sorting error cost for assigning part P7 607 to build tray J 710: parts P2 602, P3 603, P4 604, and P5 605 have already been assigned to build tray J 710; parts P2 602, P4 604, and P5 605 are from the same order (order A 610) as part P7, so parts P2 602, P4 604, and P5 605 are not considered in computing the sorting error. Part P3 603 is from a different order (order B 620). For part P2 602 there is an error cost of $100, and a 2% error probability, so the expected value of the part error cost is $2. Because there are no other parts to consider, $2 is selected for use as the estimated sorting error cost for build tray J 710. With regard to computing the sorting error cost for assigning part P7 607 to build tray K 720: parts P1 601 and P6 606 have already been assigned to build tray J 710, and parts P1 601 and P6 606 are both from a different order (order B 620) than part P7 607. For part P1 601 there is an error cost of $100, and a 0% error probability, so the expected value of the part error cost is $0. For part P6 606 there is an error cost of $100, and an 80% error probability, so the expected value of the part error cost is $80. The maximum of the expected values, in this case $80, is selected for use as the estimated sorting error cost if part P6 606 were placed in build tray K 720. Thus build tray J 710 has a $2 sorting error cost, build tray K 720 has an $80 sorting error cost, and so part P6 606 is assigned to build tray J 710 which has the lowest sorting error cost, as in FIG. 7G.

Consider now, with reference to FIGS. 8A-8D, the sorting of example fabricated parts from one of the build trays of FIG. 7G—specifically, build tray J 710—into order A 610 and order B 620. In this example, the predicted characteristic is mass, and the measured characteristic is weight. In this example, the sorting is performed as the fabricated parts are removed from build tray J 710. A scale 820 measures the weight of build tray J 710 before and after a fabricated part is removed from the tray J 710, and calculates the weight of the part as the difference between the two weights. The predicted and/or measured characteristic can be adjusted to account for any additional mass or weight associated with the part due to adhered powder and/or attached sacrificial structures. The parts may be removed from the build tray J 710 in any order.

Figure 8A:
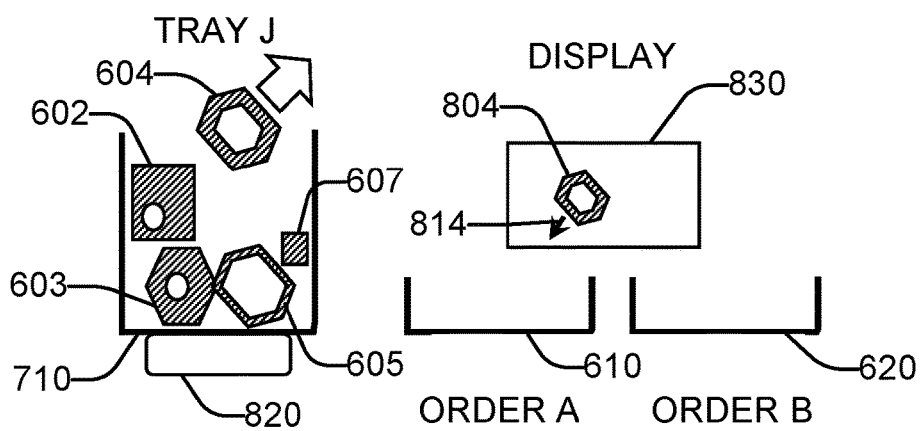
FIGS. 8A-8D are schematic sequential representations of sorting the example fabricated parts from one of the two example build trays of FIG. 7 into the two example orders of FIG. 6, in accordance with an example of the present disclosure.

In FIG. 8A, five fabricated parts—part P2 602, part P3 603, part P4 604, part P5 605, and part P7 607—are in build tray J 710. Part P4 604 is removed from build tray J 710. The order fulfillment system—for example, system 100 (FIG. 1) or system 200 (FIG. 2)—compares the measured characteristic of part P4 604 (weight) with the predicted characteristic (mass) of the unsorted fabricated parts from the same build tray: part P2 602, part P3 603, part P4 604, part P5 605, and part P7 607. In this case, there is a single match, within a predefined tolerance, between the measured and predicted characteristics, and the part removed from the build tray J 710 is identified as part P4 604. In this example, an image 804 of part P4 604 is presented to an operator on a display 830, and an indication 814 indicates that part P4 604 is associated with order A 610. The operator may then place the part with order A 610, and may acknowledge to the order fulfillment system that this has been performed.

Figure 8B:
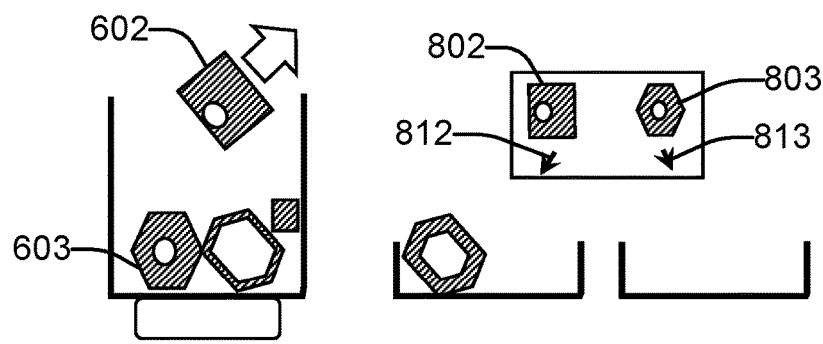

In FIG. 8B, four fabricated parts—part P2 602, part P3 603, part P5 605, and part P7 607—remain in build tray J 710. Part 2 602 is removed from build tray J 710. The order fulfillment system compares the measured characteristic of part P2 602 (weight) with the predicted characteristic (mass) of the unsorted fabricated parts from the same build tray: part P2 602, part P3 603, part P5 605, and part P7 607. In this case, there are two matches, within a predefined tolerance, between the measured and predicted characteristics: part P2 602 and part P3 603. This indicates that both part P2 602 and part P3 603 have a mass (and weight) within the predefined tolerance, although their appearance is quite different. Thus images of both parts are presented to an operator on the display 830: image 802 of part P2 602 with indication 812 that part P2 602 is associated with order A 610, and image 803 of part P3 603 with indication 813 that part P3 603 is associated with order B 620. In this example, the operator decides, based on the images 802, 803 that the part removed from the build tray J 710 is part P2 602. The operator may then place the part with order A 610, and may acknowledge to the order fulfillment system that this has been performed.

Figure 8C:
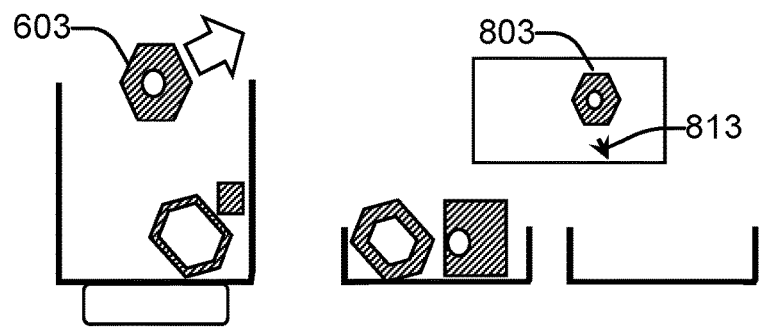

In FIG. 8C, three fabricated parts—part P3 603, part P5 605, and part P7 607—remain in build tray J 710. Part P3 603 is removed from build tray J 710. The order fulfillment system compares the measured characteristic of part P3 603 (weight) with the predicted characteristic (mass) of the unsorted fabricated parts from the same build tray: part P3 603, part P5 605, and part P7 607. In this case, there is a single match, within a predefined tolerance, between the measured and predicted characteristics, and the part removed from the build tray J 710 is identified as part P3 603. In this example, an image 803 of part P34 603 is presented to an operator on the display 830, and an indication 813 indicates that part P3 603 is associated with order B 620. The operator may then place the part with order B 620, and may acknowledge to the order fulfillment system that this has been performed. At this point, the order fulfillment system determines that all of the parts in build tray J 710 which are associated with order B 620 have already been sorted into order B 620.

Figure 8D:
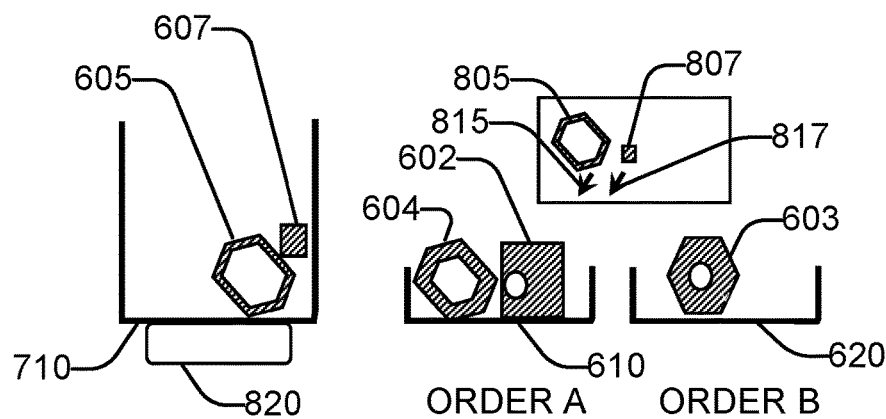

In FIG. 8D, two fabricated parts—part P5 605, and part P7 607—remain in build tray J 710. Because no remaining unsorted parts in build tray J 710 are associated with order B 620, order B 620 is no longer to be considered in sorting the parts in build tray J 710. As a result, the remaining unsorted parts in build tray J 710 are associated with order A 610. Thus images of part P5 605 and part P7 607 are presented to the operator on the display 830, with corresponding indications 815, 817 that both of these parts are associated with order A 610. The operator may then place part P5 605 and part P7 607 with order A 610, and may acknowledge to the order fulfillment system that this has been performed. At this time, no parts remain in build tray J 710, and sorting of this build tray is completed. Sorting of the parts in build tray K 720 may then be undertaken in an analogous manner.

In some examples, at least one block or step discussed herein is automated. In other words, apparatus, systems, and methods occur automatically. As defined herein and in the appended claims, the terms "automated" or "automatically" (and like variations thereof) shall be broadly understood to mean controlled operation of an apparatus, system, and/or process using computers and/or mechanical/electrical devices without the necessity of human intervention, observation, effort and/or decision.

From the foregoing it will be appreciated that the system, method, and medium provided by the present disclosure represent a significant advance in the art. Although several specific examples have been described and illustrated, the disclosure is not limited to the specific methods, forms, or arrangements of parts so described and illustrated. This description should be understood to include all combinations of elements described herein, and claims may be presented in this or a later application to any combination of these elements. The foregoing examples are illustrative, and different features or elements may be included in various combinations that may be claimed in this or a later application. Unless otherwise specified, operations of a method claim need not be performed in the order specified. Similarly, blocks in diagrams or numbers (such as (1), (2), etc.) should not be construed as operations that proceed in a particular order. Additional blocks/operations may be added, some blocks/operations removed, or the order of the blocks/operations altered and still be within the scope of the disclosed examples. Further, methods or operations discussed within different figures can be added to or exchanged with methods or operations in other figures. Further yet, specific numerical data values (such as specific quantities, numbers, categories, etc.) or other specific information should be interpreted as illustrative for discussing the examples. Such specific information is not provided to limit examples. The disclosure is not limited to the above-described implementations, but instead is defined by the appended claims in light of their full scope of equivalents. Where the claims recite "a" or "a first" element of the equivalent thereof, such claims should be understood to include incorporation of at least one such element, neither requiring nor excluding two or more such elements. Where the claims recite "having", the term should be understood to mean "comprising".

What is claimed is:

1. A method for controlling additive manufacturing, comprising:
predicting, by a controller, characteristics of a plurality of parts in plural orders, the predicting of the characteristics of the plurality of parts being based on computer models corresponding to the plurality of parts;
assigning, by the controller, the computer models to build trays usable to fabricate corresponding parts of the plurality of parts, wherein the assigning comprises:
comparing the predicted characteristics to determine a similarity of a first predicted characteristic of a first part based on a first computer model to a second predicted characteristic of a second part based on a second computer model, wherein the first computer model and the second computer model are from different orders of the plural orders, and
assigning, based on the determined similarity, the first computer model to a first build tray, and the second computer model to a second build tray such that the first and second computer models, from the different orders, having similar predicted characteristics are assigned to different build trays so as to avoid confusion between the first and second parts after fabrication, wherein a build tray of the build trays is assigned multiple computer models from different orders;
fabricating the plurality of parts corresponding to the computer models in the build trays; and
sorting the fabricated plurality of parts into the plural orders by matching a measured characteristic of a fabricated part in a given build tray to a predicted characteristic of an unsorted fabricated part in the given build tray.

2. The method of claim 1, wherein the measured characteristic of the fabricated part in the given build tray comprises a volume of the fabricated part, and the predicted characteristic of the unsorted fabricated part comprises a volume of the unsorted fabricated part.

3. The method of claim 2, comprising:
measuring the volume of the fabricated part using a level sensor that measures a change in liquid level in a bath in which the fabricated part has been immersed.

4. The method of claim 1, comprising measuring the measured characteristic of the fabricated part in the given build tray using a sensor.

5. The method of claim 1, wherein the assigning of the first computer model to the first build tray comprises:
determining a set of build trays having sufficient space available to fabricate the first part that corresponds to the first computer model,
computing a sorting error cost for assigning the first computer model to each build tray in the set of build trays, and
assigning the first computer model to the first build tray in the set the of build trays in response to the first build tray being associated with a lowest sorting error cost of the computed sorting error costs.

6. The method of claim 5, wherein for each respective build tray in the set of build trays, computing a respective sorting error cost comprises:
estimating a probability of confusing the first part corresponding to the first computer model with each other part, from a different order, corresponding to a computer model already assigned to the respective build tray;
calculating, using the probability, a part error cost resulting from confusing the first part with each other part; and
selecting a highest part error cost as the respective sorting error cost.

7. The method of claim 6, wherein the estimating comprises:
comparing a predicted characteristic of the first part corresponding to the first computer model with a predicted characteristic of each other part.

8. The method of claim 6, wherein the computing the respective sorting error cost further comprises:
adding to the set of build trays an additional build tray having no assigned computer models; and
determining a part error cost for assigning the first computer model to the additional build tray as an additional processing cost of the additional build tray.

9. A system for additive manufacturing, comprising:
a sensor to measure a volume of a first part fabricated in a first build tray; and
a controller coupled to the sensor and to:
assign a plurality of digital models, having similar predicted characteristics and from different orders, to different build trays usable to fabricate corresponding parts, wherein the first build tray is assigned digital models from plural orders, and
sort the first part from the first build tray into a corresponding order of the plural orders by comparing the measured volume of the first part to predicted volumes of as yet unsorted fabricated parts from the first build tray.

10. The system of claim 9, comprising:
an operator interface coupled to the controller, wherein the controller is further to cause display via the operator interface an image of a respective part having a same predicted characteristic as a measured characteristic of a particular fabricated part, and an indication of an order associated with the respective part.

11. The system of claim 9,
wherein the sensor is a level sensor to measure a change in liquid level of a bath due to immersion of the first part in the bath, the change in liquid level of the bath corresponding to the volume of the first part.

12. The system of claim 9, comprising:
a scale to measure an order weight of sorted fabricated parts for a particular order,
wherein the controller is further to
calculate a predicted order weight from a mass of parts in the particular order, and
determine whether the particular order is complete by comparing the predicted order weight to the measured order weight.

13. A system for additive manufacturing, comprising:
a sensor to measure a characteristic of a fabricated part in a build tray, wherein the measured characteristic is determined before post-fabrication operations on the fabricated part are completed; and
a controller coupled to the sensor and to:

assign digital models, having similar predicted characteristics and from different orders, to different build trays usable to fabricate corresponding parts, wherein the build tray is assigned digital models from plural orders, and sort the fabricated part from the build tray into a corresponding order of the plural orders by comparing the measured characteristic of the fabricated part to predicted characteristics of as yet unsorted fabricated parts from the build tray, wherein the predicted characteristics of the as yet unsorted fabricated parts are adjusted to account for excess materials on the as yet unsorted fabricated parts at a time the measured characteristic is determined.

14. The system of claim 13, wherein the post-fabrication operations comprise removing unfused build material from the fabricated part and the as yet unsorted fabricated parts.

15. A non-transitory computer-readable storage medium comprising instructions for controlling additive manufacturing, the instructions upon execution causing a system to:

predict characteristics of a plurality of parts in plural orders, the predicting of the characteristics of the plurality of parts being based on computer models corresponding to the plurality of parts;

based on the predicted characteristics, assign the computer models to build trays usable to fabricate corresponding parts of the plurality of parts, wherein the assigning comprises:

comparing the predicted characteristics to determine a similarity of a first predicted characteristic of a first part based on a first computer model to a second predicted characteristic of a second part based on a second computer model, wherein the first computer model and the second computer model are from different orders of the plural orders, and assigning, based on the determined similarity, the first computer model to a first build tray, and the second computer model to a second build tray; and for a respective build tray of the build trays, sort fabricated parts in the respective build tray into the plural orders by matching a measured characteristic of a fabricated part in the respective build tray to predicted characteristics of unsorted fabricated parts in the respective build tray.

16. The non-transitory computer-readable storage medium of claim 15, wherein a build tray of the build trays is assigned computer models from different orders of the plural orders.

17. The non-transitory computer-readable storage medium of claim 15, wherein the instructions upon execution cause the system to:

control a sensor to acquire the measured characteristic of the fabricated part in the respective build tray.

18. The non-transitory computer-readable storage medium of claim 15, wherein the measured characteristic of the fabricated part in the respective build tray comprises a volume of the fabricated part, and the predicted characteristic of each respective unsorted fabricated part in the respective build tray comprises a volume of the respective unsorted fabricated part.

* * * * *